United States Patent [19]

Lalesse

[11] 3,921,219

[45] Nov. 18, 1975

[54] MULTI-CHANNEL MAGNETIC HEAD

[75] Inventor: Herman Cornelis Lalesse, Eindhoven, Netherlands

[73] Assignee: U.S. Philips Corporation, New York, N.Y.

[22] Filed: Mar. 27, 1974

[21] Appl. No.: 455,400

[30] Foreign Application Priority Data

Mar. 31, 1973 Netherlands .................. 7304528

[52] U.S. Cl. ................ 360/121; 360/123; 360/125

[51] Int. Cl.$^2$ ...................... G11B 5/22; G11B/5/20

[58] Field of Search ........................ 360/121, 125, 360/126, 119, 122, 123

[56] References Cited

UNITED STATES PATENTS

| | | | |
|---|---|---|---|
| 2,717,928 | 9/1955 | Nordyke, Jr. | 360/126 |
| 2,872,530 | 2/1959 | Jolly | 360/126 |
| 3,166,740 | 1/1965 | Brette | 360/121 |
| 3,672,044 | 6/1972 | Tanaka et al. | 360/121 |
| 3,716,677 | 2/1973 | Tanaka et al. | 360/126 |
| 3,829,895 | 8/1974 | Tanaka et al. | 360/125 |

*Primary Examiner*—Alfred H. Eddleman
*Attorney, Agent, or Firm*—Frank R. Trifari

[57] ABSTRACT

A multi-channel magnetic head comprising a number of magnetic cores which have electric windings and which are separated from each other by non-magnetic materials, in which the individual cores comprise a first and a second pole tip of equal dimensions which enclose an operational gap, the operational gaps being located on a straight line, and in which the windings of successive cores are shifted relative to each other. In behalf of a simple and compact construction, the first pole tips form part of U-shaped core parts and the second pole tips form part of L-shaped core parts, the short limb of an L being substantially as long as the upright limb of a U.

6 Claims, 1 Drawing Figure

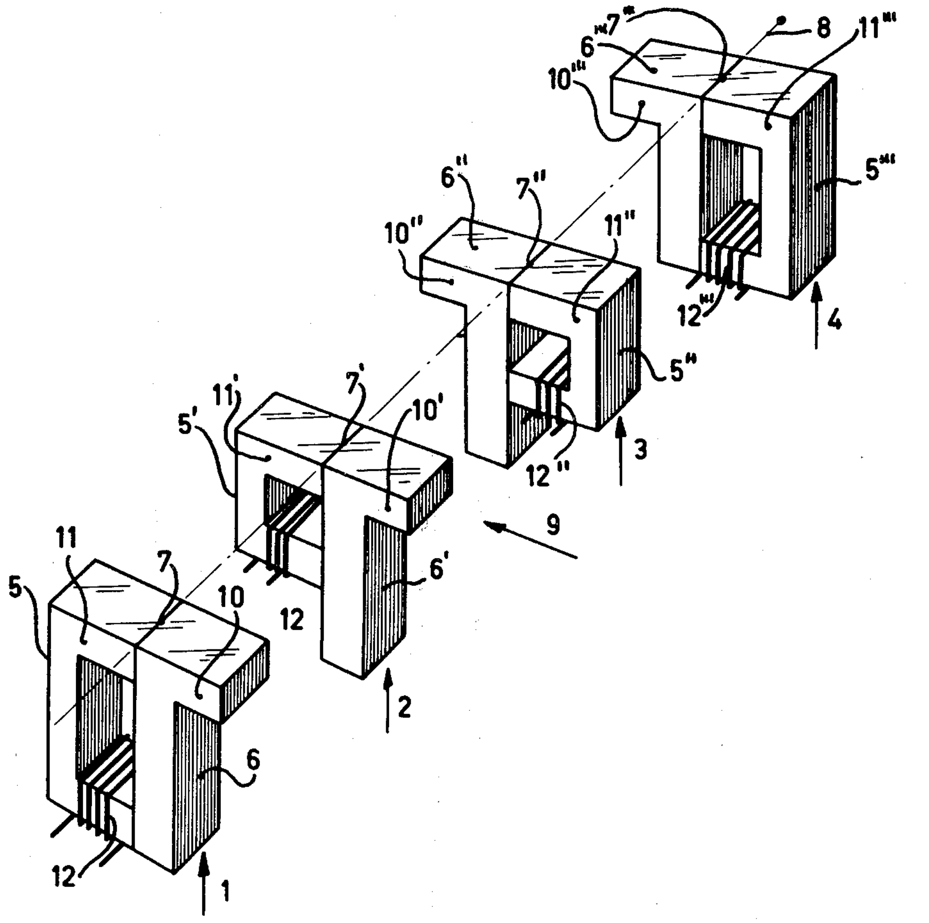
5
11
7
10
6
12
1
5'
11'
7'
10'
6'
12
2
9
10''
6''
7''
11''
5''
12''
3
10'''
6'''
7'''
8
11'''
5'''
12'''
4

MULTI-CHANNEL MAGNETIC HEAD

The invention relates to a multi-channel magnetic head comprising a number of magnetic cores which have electric windings and which are separated from each other by non-magnetic material, the individual cores comprising a first and a second pole tip of equal dimensions which enclose an operational gap, the respective operative gaps being located on a straight line, the windings of successive cores being shifted relative to each other.

In the conventional multi-channel magnetic heads of the above-described construction it is difficult to avoid the cross-talk between adjacent channels. By inserting magnetic screening plates between adjacent elementary magnetic heads (which are to be understood to mean herein magnetic cores having electric windings), the cross-talk may be reduced but this reduction is not sufficient in all cases. Another possibility consists in that adjacent elementary magnetic heads are separated from each other magnetically by using non-magnetic materials of large dimension. However, the large dimension is undesired in the manufacture of a multi-channel magnetic head having a high track density.

In multi-channel magnetic heads destined for high track densities, the magnetic cores which are located adjacent to each other are sometimes bent apart so as to gain space for the electric windings. However, this deteriorates the magnetic properties of the cores.

In a conventional multi-channel magnetic head of the present construction it is furthermore difficult to ensure that the operational gaps of all the elementary magnetic heads which form part of one multi-channel head are located on one straight line.

In addition it is of importance in connection with the wearing properties that the composite front face of a multichannel magnetic head is uniform to a high extent. Uniform is to be understood to mean herein that a recording medium which can be moved over the front face of the head meets as few transitions from one material to the other as possible on its way.

It is the object of the invention to provide a multi-channel magnetic head having a small cross-talk between adjacent channels, a large track density, good magnetic properties, a correct alignment of the gaps and a composite front face which is uniform to a high extent.

For that purpose the multi-channel magnetic head according to the invention is characterized in that the first pole tips form part of U-shaped core parts and the said second pole tips form part of L-shaped core parts, in which the short limb of an L has substantially the same length as the upright limb of a U, and in which the outside of the long limb of an L and the end face of at least one upright limb of the U are always located opposite to each other while enclosing an operational gap. An advantage of this construction is that with the use of a minimum number of different parts the U-shaped and L-shaped core parts used for the construction of each elementary head can be combined in various manners so that with a compact construction, so with a high track density, the electric windings of the adjacent elementary heads are located for apart and cross-talk hence is low. The windings can most favourably be provided on the upright limbs of the U-shaped core parts remote from the operational gaps.

Although several configurations of U- and L-shaped core parts are possible within the scope of the invention, a preferred embodiment of the multi-channel magnetic head according to the invention is characterized in that the long limb of an L engages the two end faces of the oppositely located U. The central limbs of at least one pair of successive U-shaped core parts preferably differ in length. As will be described in detail hereinafter, a very compact structure is then possible in which nevertheless a sufficient space for the windings is created.

In order to achieve that the inductances of the elementary magnetic heads are essentially the same, the U-shaped core parts differing in the length of the central limb preferably have either different magnetic permeabilities, or different cross-sections, or windings having a different winding number.

The invention will be described in greater detail, by way of example, with reference to the drawing. The drawing shows the principle of the construction of the multi-channel magnetic head according to the invention.

In the construction (of, for example, a 4-channel stereo head), magnetic cores 1, 2, 3 and 4 are used (FIG. 1). Each magnetic core consists of a U-shaped core part 5, 5', 5'', 5''' and an L-shaped core part 6, 6',6'',-6''' united therewith. These core parts may consist of moulds of sintered oxidic, ferromagnetic material (so-called ferrite) but also of a stack of laminations of magnetic material or even, when very small track widths are required, of one lamination of such material. This preferably is a material which highly resists detrition, for example, an Al-Fe-Si alloy or a Ni-Fe-Nb alloy. Each magnetic core has an operational gap 7, 7',7'',-7''' which is filled with non-magnetisable material, for example, in the form of a foil of a non-magnetisable material. All the operational gaps in the finished multi-channel magnetic head are located on a straight line 8 which is perpendicular to the direction of movement of the record carrier denoted by an arrow 9. The short limb 10, 10', 10'', 10''' of the L-shaped part 6, 6',6'', 6''' of each core is as long as the upright limb 11, 11', 11'', 11''' of the U-shaped core part 5, 5',5'',5'''. The advantage of this is that the same amount of magnetic material extends on either side of each operational gap 7, 7',7'', 7''', so that a uniform tape contact surface is obtained. In addition it facilitates the alignment of the operational gaps 7, 7',7'', 7''' in composing the magnetic cores 1, 2, 3 and 4 to form a multi-channel head. An additional advantage of the construction of the head is that a minimum of different components is necessary. The L-shaped core parts 6, 6',6'', 6''' in the case shown are all identical but this is not necessary in itself. Even fewer components suffice when the parts 6 and 6' form one assembly as well as the parts 6'' and 6'''. An embodiment of the head of ferrite is particularly suitable for this purpose. In order to create sufficient space for the windings and in order to lay the windings sufficiently far apart, two identical U-shaped core parts 5 and 5''' having a long central limb and two identical U-shaped core parts 5' and 5'' having a short central limb are necessary. The required windings 11, 11', 11'' and 11''' are provided on the U-shaped core parts 5, 5', 5'', 5'''. It is to be noted that the windings 12 and 12''' are wound throughout the length of the central limb of the U-shaped core parts 5 and 5''', respectively. Since said — long-windings need not have a large cross-section, space is saved. The windings 12 and 12' cannot be wound throughout the length of the upright limbs of the parts 5' and 5'', respectively, since the long limbs of the L-shaped core parts 6'' and 6', respectively, form an obstruction. However, in the arrangement shown there is sufficient space for said windings to give them the required large cross-section.

In behalf of a minimum coupling between the windings, successive windings can always be situated on different sides of the line 8, for example, by changing the places of the cores 2 and 3.

What is claimed is:

1. A multi-channel magnetic head comprising a plurality of magnetic cores, each having an electric winding, each core being separated from each adjacent core by non-magnetic material, each core comprising a first and a second pole tip of equal dimensions which enclose an operation gap, said operational gaps being disposed in a straight line and said windings of successive cores are shifted relative to each other to facilitate a more compact assembly, said first pole tips form part of U-shaped core parts and said second pole tips form part of L-shaped core parts, the short limb of an L having substantially the same length as an upright limb of a U, and in which the outside of the long limb of an L and the end face of at least one upright limb of the U are always located opposite to each other while enclosing an operational gap.

2. A multi-channel magnetic head as claimed in claim 1, wherein said long limb of an L engages the two end faces of the oppositely located U.

3. A multi-channel magnetic head as claimed in claim 2, wherein said electric windings are disposed on the upright limbs of each of said U-shaped core parts remote from said operational gaps.

4. A multi-channel magnetic head as claimed in claim 1, wherein the central limbs of the U-shaped core parts differ in length.

5. A multi-channel magnetic head as claimed in claim 4, wherein said U-shaped core parts differ in the length of the central limb have either different magnetic permeabilities, or different cross-sections or windings having a different winding number so that inductances are produced which are essentially the same.

6. A multi-channel magnetic head as claimed in claim 1, wherein said first and second core parts are formed from at least one lamination of a soft magnetic material.

* * * * *